United States Patent
Kim et al.

(10) Patent No.: US 12,509,924 B2
(45) Date of Patent: Dec. 30, 2025

(54) FRONT LID LATCH APPARATUS FOR VEHICLE

(71) Applicants: Hyundai Motor Company, Seoul (KR); Kia Corporation, Seoul (KR); Daedong Door Incorporated, Incheon (KR)

(72) Inventors: Sang Il Kim, Hwaseong-si (KR); Kwang Che Yun, Suwon-si (KR)

(73) Assignees: HYUNDAI MOTOR COMPANY, Seoul (KR); KIA CORPORATION, Seoul (KR); DAEDONG DOOR INCORPORATED, Incheon (KR)

( * ) Notice: Subject to any disclaimer, the term of this patent is extended or adjusted under 35 U.S.C. 154(b) by 327 days.

(21) Appl. No.: 17/892,312

(22) Filed: Aug. 22, 2022

(65) Prior Publication Data

US 2023/0160240 A1    May 25, 2023

(30) Foreign Application Priority Data

Nov. 22, 2021 (KR) .......................... 10-2021-0161622

(51) Int. Cl.
| | |
|---|---|
| E05B 81/90 | (2014.01) |
| B62D 25/12 | (2006.01) |
| E05B 79/20 | (2014.01) |
| E05B 81/14 | (2014.01) |
| E05B 81/18 | (2014.01) |
| E05B 83/24 | (2014.01) |
| E05B 85/26 | (2014.01) |
| E05B 81/04 | (2014.01) |

(52) U.S. Cl.
CPC ............. *E05B 81/90* (2013.01); *B62D 25/12* (2013.01); *E05B 79/20* (2013.01); *E05B 81/14* (2013.01); *E05B 81/18* (2013.01); *E05B 83/243* (2013.01); *E05B 85/26* (2013.01); *E05B 81/04* (2013.01)

(58) Field of Classification Search
CPC ...... E05B 83/24; E05B 83/243; E05B 83/247; E05B 81/90; E05B 79/20; E05B 83/26; E05B 85/245; E05B 85/26
See application file for complete search history.

(56) References Cited

U.S. PATENT DOCUMENTS

| | | | |
|---|---|---|---|
| 7,204,526 B2 | 4/2007 | Seo | |
| 8,419,114 B2 | 4/2013 | Fannon et al. | |
| 8,798,858 B2 * | 8/2014 | Zysk ...................... | E05B 83/26 307/326 |

(Continued)

FOREIGN PATENT DOCUMENTS

| | | | | |
|---|---|---|---|---|
| DE | 102020102336 A1 * | 8/2021 | ............. | E05B 81/20 |
| KR | 100633639 B1 | 10/2006 | | |
| KR | 101252203 B1 | 4/2013 | | |

*Primary Examiner* — Alyson M Merlino
(74) *Attorney, Agent, or Firm* — SLATER MATSIL, LLP

(57) ABSTRACT

An embodiment front lid latch apparatus for a vehicle includes a pawl lever movable between an engaging position and a disengaging position by a first actuator, a latch lever assembly movable between a first hold position and a first releasable position by a movement of the pawl lever, a safety lever movable between a second hold position and a second releasable position by a second actuator, and an emergency lever operatively connected to the pawl lever and the safety lever, and movable between a first position and a second position by a manually operable emergency release cable.

12 Claims, 19 Drawing Sheets

(56) References Cited

U.S. PATENT DOCUMENTS

| | | | |
|---|---|---|---|
| 8,935,053 B2 | 1/2015 | Wheeler et al. | |
| 9,255,429 B2* | 2/2016 | Kim | E05B 83/24 |
| 9,777,516 B2* | 10/2017 | Farooq | E05B 83/24 |
| 10,669,751 B2* | 6/2020 | Kim | E05B 83/24 |
| 11,377,881 B2* | 7/2022 | Bartola | E05B 83/24 |
| 2003/0038484 A1* | 2/2003 | Schwaiger | E05B 81/14 |
| | | | 292/201 |
| 2006/0006660 A1 | 1/2006 | Seo | |
| 2012/0161456 A1* | 6/2012 | Riedmayr | E05B 83/24 |
| | | | 292/226 |
| 2012/0280519 A1 | 11/2012 | Hong | |
| 2013/0300134 A1* | 11/2013 | Jayasuriya | E05B 83/24 |
| | | | 292/129 |
| 2016/0340941 A1* | 11/2016 | Taurasi | E05B 83/24 |
| 2017/0306661 A1* | 10/2017 | Kim | E05B 83/24 |
| 2017/0314298 A1* | 11/2017 | Tomaszewski | E05B 81/06 |
| 2018/0347240 A1* | 12/2018 | Jeong | E05B 79/20 |
| 2019/0055758 A1* | 2/2019 | Chevalier | E05B 83/24 |
| 2019/0218833 A1* | 7/2019 | Nelsen | E05B 83/24 |
| 2020/0399936 A1* | 12/2020 | Bartola | E05B 79/20 |
| 2021/0002929 A1* | 1/2021 | Nelsen | E05B 83/24 |
| 2021/0095499 A1* | 4/2021 | Sturm | E05B 85/26 |
| 2021/0172206 A1* | 6/2021 | Lim | E05B 83/24 |
| 2021/0189777 A1* | 6/2021 | Lim | E05B 83/24 |

* cited by examiner

FRONT LID LATCH APPARATUS FOR VEHICLE

CROSS-REFERENCE TO RELATED APPLICATIONS

This application claims the benefit of Korean Patent Application No. 10-2021-0161622, filed on Nov. 22, 2021, which applications is hereby incorporated herein by reference.

TECHNICAL FIELD

The present disclosure relates to a front lid latch apparatus for a vehicle.

BACKGROUND

A vehicle includes a front compartment located in the front thereof, and a front lid mounted on the top of the front compartment and designed to open and close. A powertrain system including an internal combustion engine and/or an electric motor, a heating, ventilation, and air conditioning (HVAC) system, and a cooling module may be disposed in the front compartment. The front lid such as a hood and a frunk lid may be pivotally mounted on the top of the front compartment so as to cover or uncover the top of the front compartment.

A pure electric vehicle or a mid-engined car includes a frunk provided in the front compartment, and the frunk is defined as a trunk located in an upper portion of the front compartment. The frunk may have a receiving space in which luggage is received, and a frunk opening allowing access to the receiving space. In some electric vehicles, a frunk lid and a hood may be individually used. In other electric vehicles, a frunk lid and a hood may be used in common.

The vehicle includes a front lid latch apparatus capable of locking or unlocking the front lid. The front lid latch apparatus of the electric vehicle may be configured to operate a latch assembly by an actuator using electric energy.

In an emergency condition in which electric energy cannot be supplied, the front lid latch apparatus according to the related art may perform the emergency opening of the front lid by supplying electric energy to the actuator through an external power supply device.

However, it is very complicated and cumbersome to supply electric energy by the external power supply device, which reduces user convenience.

The above information described in this background section is provided to assist in understanding the background of the inventive concept, and may include any technical concept which is not considered as the prior art that is already known to those skilled in the art.

SUMMARY

The present disclosure relates to a front lid latch apparatus for a vehicle. Particular embodiments relate to a front lid latch apparatus for a vehicle that can facilitate emergency opening of a front lid.

Embodiments of the present disclosure can solve problems occurring in the prior art while advantages achieved by the prior art are maintained intact.

An embodiment of the present disclosure provides a front lid latch apparatus for a vehicle that can facilitate emergency opening of a front lid by making emergency release of a striker easy through a simple mechanical mechanism.

According to an embodiment of the present disclosure, a front lid latch apparatus for a vehicle may include a pawl lever movable between an engaging position and a disengaging position by a first actuator, a latch lever assembly movable between a first hold position and a first releasable position by a movement of the pawl lever, a safety lever movable between a second hold position and a second releasable position by a second actuator, and an emergency lever operatively connected to the pawl lever and the safety lever, and movable between a first position and a second position by a manually operable emergency release cable.

As the pawl lever is movable between the engaging position and the disengaging position by the first actuator, the latch lever assembly is movable between the first hold position and the first releasable position by the movement of the pawl lever, the safety lever is movable between the second hold position and the second releasable position by the second actuator, and the emergency lever forces the pawl lever to move to the disengaging position, forces the latch lever assembly to move to the first releasable position, and forces the safety lever to move to the second releasable position by the manually operable emergency release cable (mechanical mechanism), the emergency opening of the front lid may be carried out very quickly and easily.

The first position refers to a position in which the emergency lever keeps the pawl lever in the engaging position, keeps the latch lever assembly in the first hold position, and keeps the safety lever in the second hold position, and the second position refers to a position in which the emergency lever forces the pawl lever to move to the disengaging position, forces the latch lever assembly to move to the first releasable position, and forces the safety lever to move to the second releasable position.

When the emergency lever is in the first position, the pawl lever may be kept in the engaging position, the latch lever assembly may be kept in the first hold position, and the safety lever may be kept in the second hold position, and thus the striker fixed to the front lid may be locked to the front lid latch apparatus. When the emergency lever is in the second position, the pawl lever may be in the disengaging position, the latch lever assembly may be in the first releasable position, and the safety lever may be in the second releasable position, and thus the striker fixed to the front lid may be unlocked from the front lid latch apparatus.

The emergency lever may include a first guide pin protruding toward the pawl lever, and the first guide pin may contact the pawl lever.

The emergency lever may be connected to the pawl lever through the first guide pin in a manner that contacts the pawl lever, and the pawl lever may move to the disengaging position by the rotation of the emergency lever.

The emergency lever may include a second guide pin protruding toward the safety lever, and the second guide pin may contact the safety lever.

The emergency lever may be connected to the safety lever through the second guide pin in a manner that contacts the safety lever, and the safety lever may move to the second releasable position by the rotation of the emergency lever.

The pawl lever may have a first guide surface guiding a movement of the first guide pin.

As the movement of the first guide pin of the emergency lever is guided along the first guide surface of the pawl lever, the emergency lever may force the pawl lever to rotate.

The safety lever may have a second guide surface guiding a movement of the second guide pin.

As the movement of the second guide pin of the emergency lever is guided along the second guide surface of the safety lever, the emergency lever may force the safety lever to rotate.

The front lid latch apparatus may further include a mounting bracket rotatably supporting the pawl lever, the latch lever assembly, the safety lever, and the emergency lever.

As the mounting bracket rotatably supports the pawl lever, the latch lever assembly, the safety lever, and the emergency lever, the mounting bracket may efficiently implement any operative connection system between the pawl lever, the latch lever assembly, the safety lever, and the emergency lever.

The mounting bracket may include a first surface on which the safety lever is rotatably mounted and a second surface on which the pawl lever, the latch lever assembly, and the emergency lever are rotatably mounted.

Accordingly, the safety lever may face the pawl lever, the latch lever assembly, and the emergency lever with the mounting bracket interposed therebetween.

The mounting bracket may have a guide slot guiding a movement of the second guide pin, and the second guide pin may extend through the guide slot.

As the second guide pin is guided by the guide slot of the mounting bracket, the movement of the emergency lever may be stably guided through the guide slot of the mounting bracket.

The pawl lever may be rotatably mounted on the second surface of the mounting bracket through a first pivot pin, the latch lever assembly may be rotatably mounted on the second surface of the mounting bracket through a second pivot pin, the safety lever may be rotatably mounted on the first surface of the mounting bracket through a third pivot pin, and the emergency lever may be rotatably mounted on the second surface of the mounting bracket through a fourth pivot pin.

The pawl lever, the latch lever assembly, the safety lever, and the emergency lever may be rotatably mounted on the mounting bracket through the corresponding pivot pins, respectively, and thus the pawl lever, the latch lever assembly, the safety lever, and the emergency lever may be rotatably supported to the mounting bracket.

The pawl lever may be biased toward the engaging position by a first biasing member, the latch lever assembly may be biased toward the first releasable position by a second biasing member, the safety lever may be biased toward the second hold position by a third biasing member, and the emergency lever may be biased toward the first position by a fourth biasing member.

The pawl lever, the latch lever assembly, the safety lever, and the emergency lever may be biased toward specific positions through the corresponding biasing members, and thus the pawl lever, the latch lever assembly, the safety lever, and the emergency lever may stably hold the striker in a normal condition (non-emergency condition).

The pawl lever may include an engaging surface with which the latch lever assembly is releasably engaged.

The latch lever assembly may include an engaging surface releasably engaged with the engaging surface of the pawl lever.

The latch lever assembly may include a first latch lever, a second latch lever connected to the first latch lever, and a spacer interposed between the first latch lever and the second latch lever.

The latch lever assembly may have a catch slot in which the striker is held, and the catch slot may be opened toward the pawl lever.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
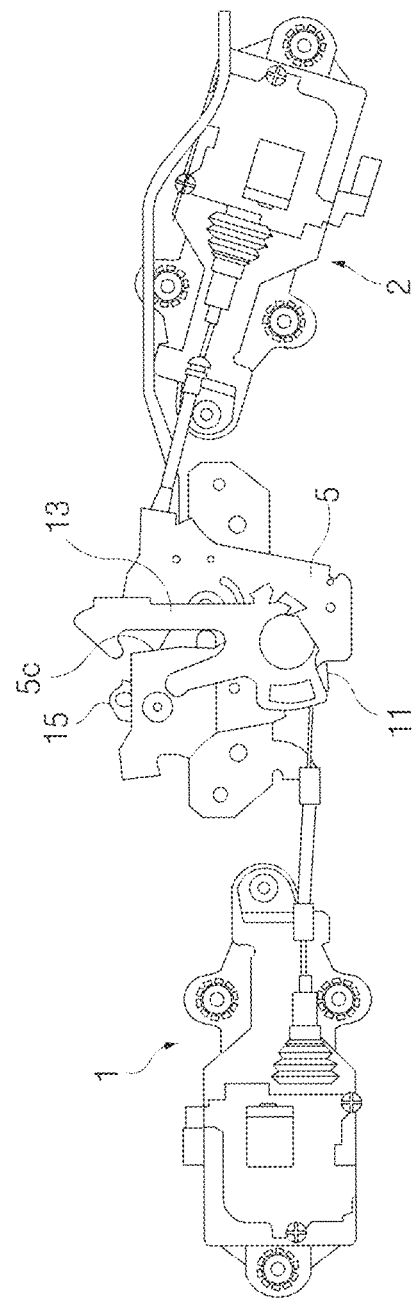
FIG. 1 illustrates a front lid latch apparatus for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
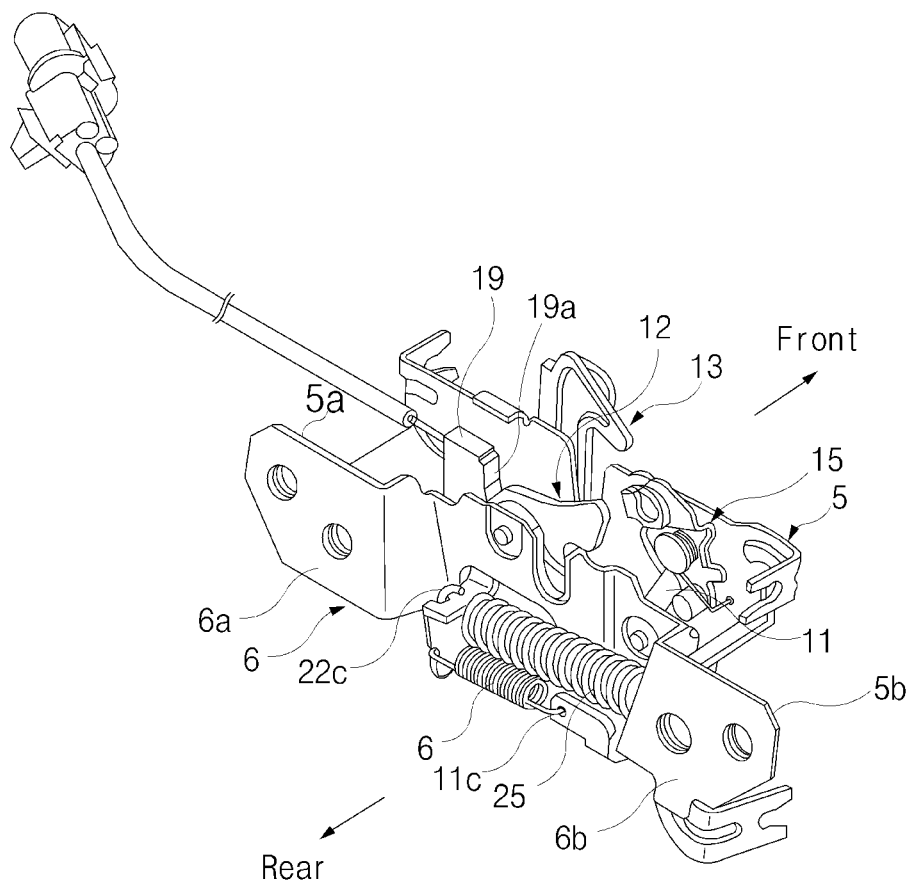
FIG. 2 illustrates a perspective view of a front lid latch apparatus for a vehicle according to an exemplary embodiment of the present disclosure, from which a first actuator and a second actuator are removed.
Figure 3:
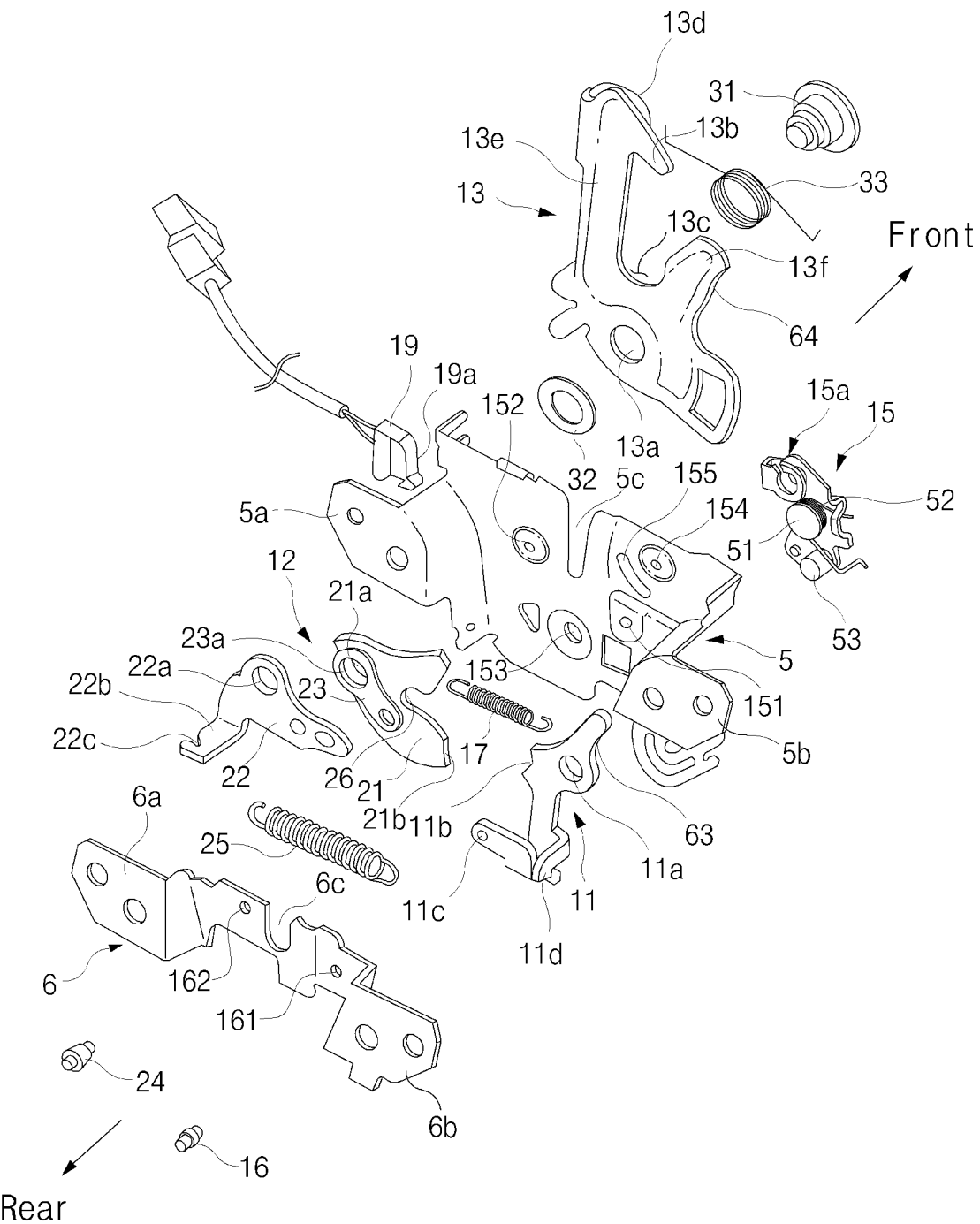
FIG. 3 illustrates an exploded perspective view of elements of the front lid latch apparatus illustrated in FIG. 2.

Referring to FIGS. 1 to 3, a front lid latch apparatus for a vehicle according to an exemplary embodiment of the present disclosure may include a first mounting bracket 5 and a second mounting bracket 6 facing the first mounting bracket 5.

The first mounting bracket 5 and the second mounting bracket 6 may be mounted on a front structure of the vehicle such as a front end module of the vehicle. A striker 8 (see FIGS. 4 and 5) may be mounted on a front lid, and the front lid may be any one of a hood and a frunk lid.

The striker 8 may be held or released by the front lid latch apparatus. The striker 8 may have an engaging leg 8a, and the engaging leg 8a of the striker 8 may be held or released by a pawl lever 11, a latch lever assembly 12, and a safety lever 13 to be described below.

Referring to FIG. 3, the first mounting bracket 5 may have two mounting portions 5a and 5b provided on both sides thereof, and the first mounting bracket 5 may have a slot 5c receiving the striker 8 in a central portion thereof. The first mounting bracket 5 may have a plurality of mounting holes 151, 152, 153, and 154.

Referring to FIG. 3, the second mounting bracket 6 may have two mounting portions 6a and 6b provided on both sides thereof, and the second mounting bracket 6 may have a slot 6c receiving the striker 8 in a central portion thereof. The second mounting bracket 6 may have a plurality of mounting holes 161 and 162.

Referring to FIG. 2, the mounting portions 6a and 6b of the second mounting bracket 6 may be mounted on the corresponding mounting portions 5a and 5b of the first mounting bracket 5 using fasteners, welding, and/or the like. The slot 6c of the second mounting bracket 6 may be at least partially aligned with the slot 5c of the first mounting bracket 5.

The front lid latch apparatus for a vehicle according to an exemplary embodiment of the present disclosure may include the pawl lever 11, the latch lever assembly 12 operatively connected to the pawl lever 11, the safety lever 13 cooperating with the latch lever assembly 12, and an emergency lever 15 operatively connected to the pawl lever 11 and the safety lever 13.

The first mounting bracket 5 and the second mounting bracket 6 may rotatably support the pawl lever 11 and the latch lever assembly 12, and the first mounting bracket 5 may rotatably support the safety lever 13 and the emergency lever 15.

The first mounting bracket 5 may have a first surface and a second surface opposing each other. The safety lever 13 may be rotatably mounted on the first surface of the first mounting bracket 5. The pawl lever 11, the latch lever assembly 12, and the emergency lever 15 may be rotatably mounted on the second surface of the first mounting bracket 5. That is, the safety lever 13 may face the pawl lever 11, the latch lever assembly 12, and the emergency lever 15 with the first mounting bracket 5 interposed therebetween.

According to an exemplary embodiment, the first surface of the first mounting bracket 5 may face the front of the vehicle, and the second surface of the first mounting bracket 5 may face the rear of the vehicle. The second mounting bracket 6 may be spaced apart from the second surface of the first mounting bracket 5 by a predetermined gap.

Figure 7:
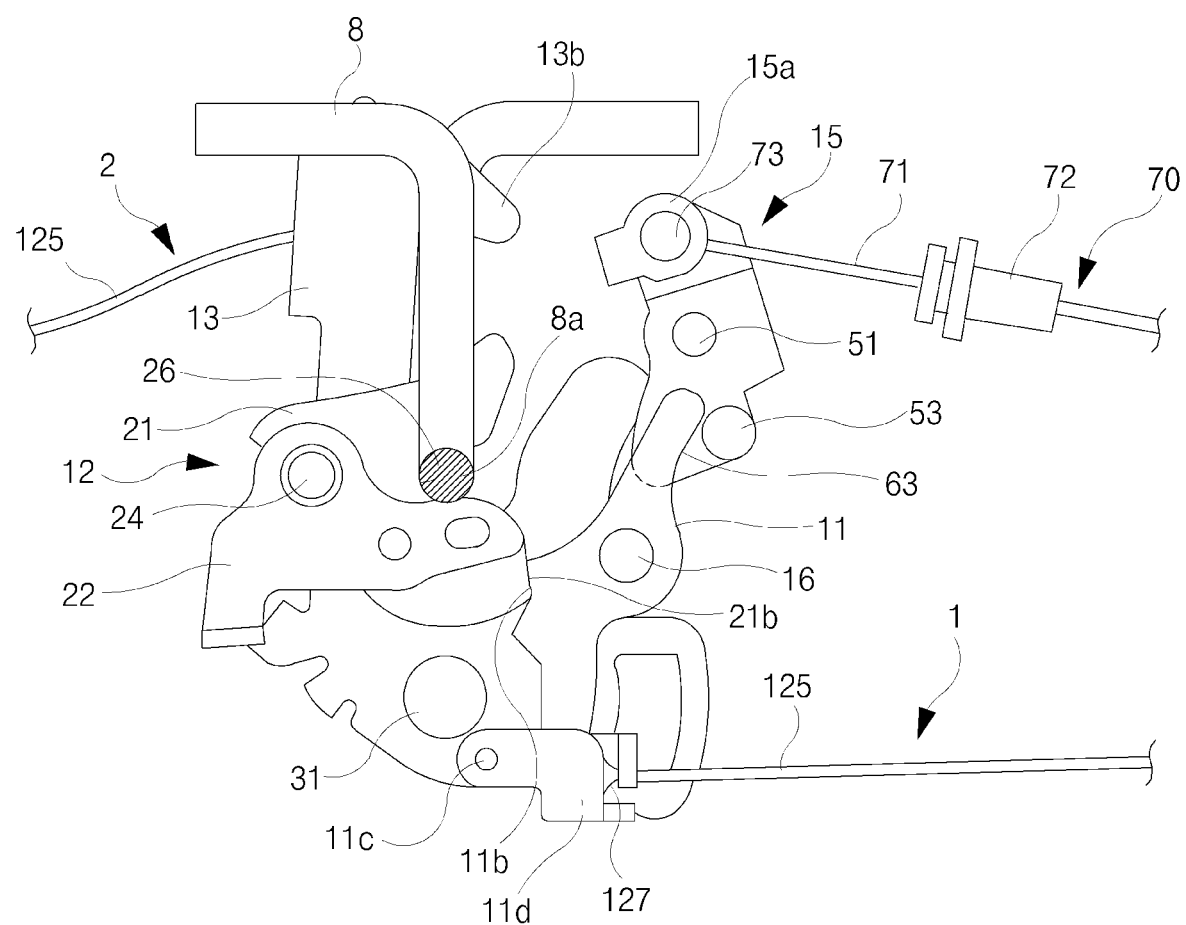
FIG. 7 illustrates a rear view of a pawl lever, a latch lever assembly, and a safety lever of the front lid latch apparatus illustrated in FIG. 6, from which a first mounting bracket and a second mounting bracket are removed.
Figure 13:
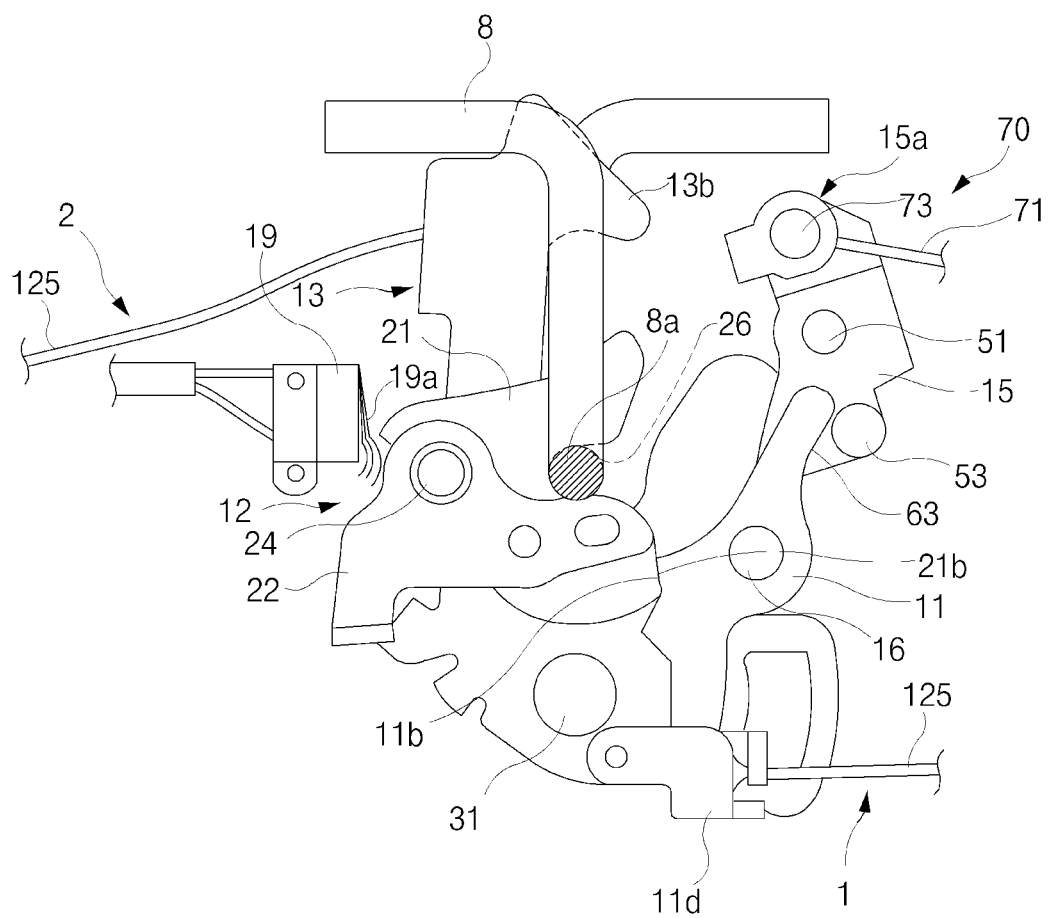
FIG. 13 illustrates a state in which an emergency lever is in a first position, a pawl lever is in an engaging position, and a latch lever assembly is in a first hold position in a front lid latch apparatus for a vehicle according to an exemplary embodiment of the present disclosure.
Figure 17:
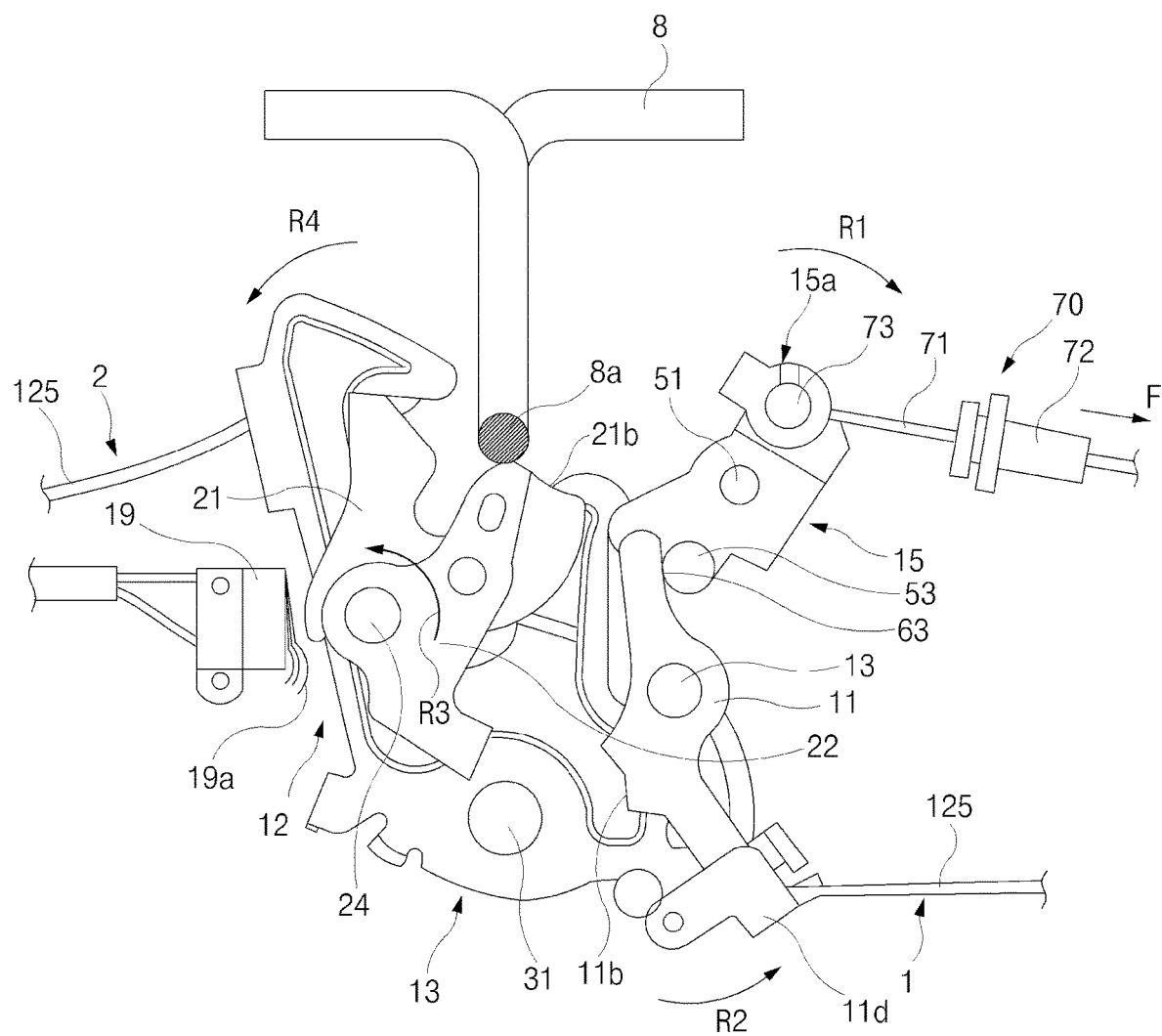
FIG. 17 illustrates a state in which an emergency lever is in a second position, a pawl lever is in a disengaging position, a latch lever assembly is in a first release position, and a safety lever is in a second release position in a front lid latch apparatus for a vehicle according to an exemplary embodiment of the present disclosure.

Referring to FIG. 2, the pawl lever 11 may be rotatably mounted between the first mounting bracket 5 and the second mounting bracket 6. The pawl lever 11 may move between an engaging position and a disengaging position by a first actuator 1. Referring to FIGS. 3, 7, and 13, the engaging position refers to a position in which the pawl lever 11 is engaged with the latch lever assembly 12. Referring to FIG. 17, the disengaging position refers to a position in which the pawl lever 11 is disengaged from the latch lever assembly 12.

The first actuator 1 may include a drive motor using electric energy, and the first actuator 1 may be connected to the pawl lever 11 through a release cable 125. Referring to FIG. 3, the pawl lever 11 may have a fitting portion 11d into which a knob 127 of the release cable 125 of the first actuator 1 is fitted.

Referring to FIG. 3, the pawl lever 11 may include a mounting hole 11a in which a first pivot pin 16 is mounted, and an engaging surface 11b with which a first latch lever 21 of the latch lever assembly 12 is releasably engaged. The first pivot pin 16 may be mounted between the first mounting bracket 5 and the second mounting bracket 6, and the first pivot pin 16 may extend through the mounting hole 11a of the pawl lever 11. Specifically, both ends of the first pivot pin 16 may be mounted in the mounting hole 151 of the first mounting bracket 5 and the mounting hole 161 of the second mounting bracket 6, respectively, and the first pivot pin 16 may be fitted into the mounting hole 11a of the pawl lever 11. As the pawl lever 11 rotates (pivots) around the first pivot pin 16, the pawl lever 11 may move between the engaging position (see FIGS. 3, 7, and 13) and the disengaging position (see FIG. 17).

The pawl lever 11 may be biased toward the engaging position by a first biasing member 17, and the first biasing member 17 may be mounted between the first mounting bracket 5 and the pawl lever 11. For example, the first biasing member 17 may be a compression spring. The pawl lever 11 may have a mounting hole 11c in which one end of the first biasing member 17 is mounted.

The latch lever assembly 12 and the pawl lever 11 may face each other with respect to the slot 5c of the first mounting bracket 5.

Referring to FIG. 2, the latch lever assembly 12 may be rotatably mounted between the first mounting bracket 5 and the second mounting bracket 6.

The latch lever assembly 12 may move between a first hold position and a first releasable position between the first mounting bracket 5 and the second mounting bracket 6. Referring to FIGS. 3, 7, and 13, the first hold position refers to a position in which the engaging leg 8a of the striker 8 is held by the latch lever assembly 12. Referring to FIG. 17, the first releasable position refers to a position in which the engaging leg 8a of the striker 8 is releasable from the latch lever assembly 12. When the pawl lever 11 is in the engaging position, the latch lever assembly 12 may be in the first hold position, and when the pawl lever 11 is in the disengaging position, the latch lever assembly 12 may be in the first releasable position.

The latch lever assembly 12 may be rotatably mounted between the first mounting bracket 5 and the second mounting bracket 6 through a second pivot pin 24. The second pivot pin 24 may be mounted between the first mounting bracket 5 and the second mounting bracket 6, and the second pivot pin 24 may extend through a mounting hole of the latch lever assembly 12. Specifically, both ends of the second pivot pin 24 may be mounted in the mounting hole 152 of the first mounting bracket 5 and the mounting hole 162 of the second mounting bracket 6, respectively, and the second pivot pin 24 may be fitted into the mounting hole of the latch lever assembly 12.

Referring to FIG. 3, the latch lever assembly 12 may include the first latch lever 21, a second latch lever 22 connected to the first latch lever 21, and a spacer 23 interposed between the first latch lever 21 and the second latch lever 22. The spacer 23 may prevent wear between the first latch lever 21 and the second latch lever 22. The first latch lever 21 may have a mounting hole 21a, the spacer 23 may have a mounting hole 23a aligned with the mounting hole 21a of the first latch lever 21, and the second latch lever 22 may have a mounting hole 22a aligned with the mounting hole 21a of the first latch lever 21 and the mounting hole 23a of the spacer 23. The second pivot pin 24 may be fitted into the mounting hole 21a of the first latch lever 21, the mounting hole 23a of the spacer 23, and the mounting hole 22a of the second latch lever 22, and the first latch lever 21, the spacer 23, and the second latch lever 22 may rotate together around the second pivot pin 24 in the same direction. As the latch lever assembly 12 rotates (pivots) around the second pivot pin 24, the latch lever assembly 12 may move between the first hold position (see FIGS. 3, 7, and 13) and the first releasable position (see FIG. 17).

The first latch lever 21 may have an engaging surface 21b facing the pawl lever 11, and the engaging surface 21b of the first latch lever 21 may be releasably engaged with the engaging surface 11b of the pawl lever 11. In addition, the first latch lever 21 may have a catch slot 26 in which the engaging leg 8a of the striker 8 is held, and the catch slot 26 may be opened toward the pawl lever 11. The engaging surface 21b may be adjacent to the catch slot 26.

The latch lever assembly 12 may be biased toward the first releasable position by a second biasing member 25, and the second biasing member 25 may be mounted between the latch lever assembly 12 and the first mounting bracket 5. For example, the second biasing member 25 may be a compression spring. Specifically, the second latch lever 22 may have a projection portion 22b protruding toward the second mounting bracket 6, and the projection portion 22b of the second latch lever 22 may have a recess 22c into which one end of the second biasing member 25 is fitted.

Figure 15:
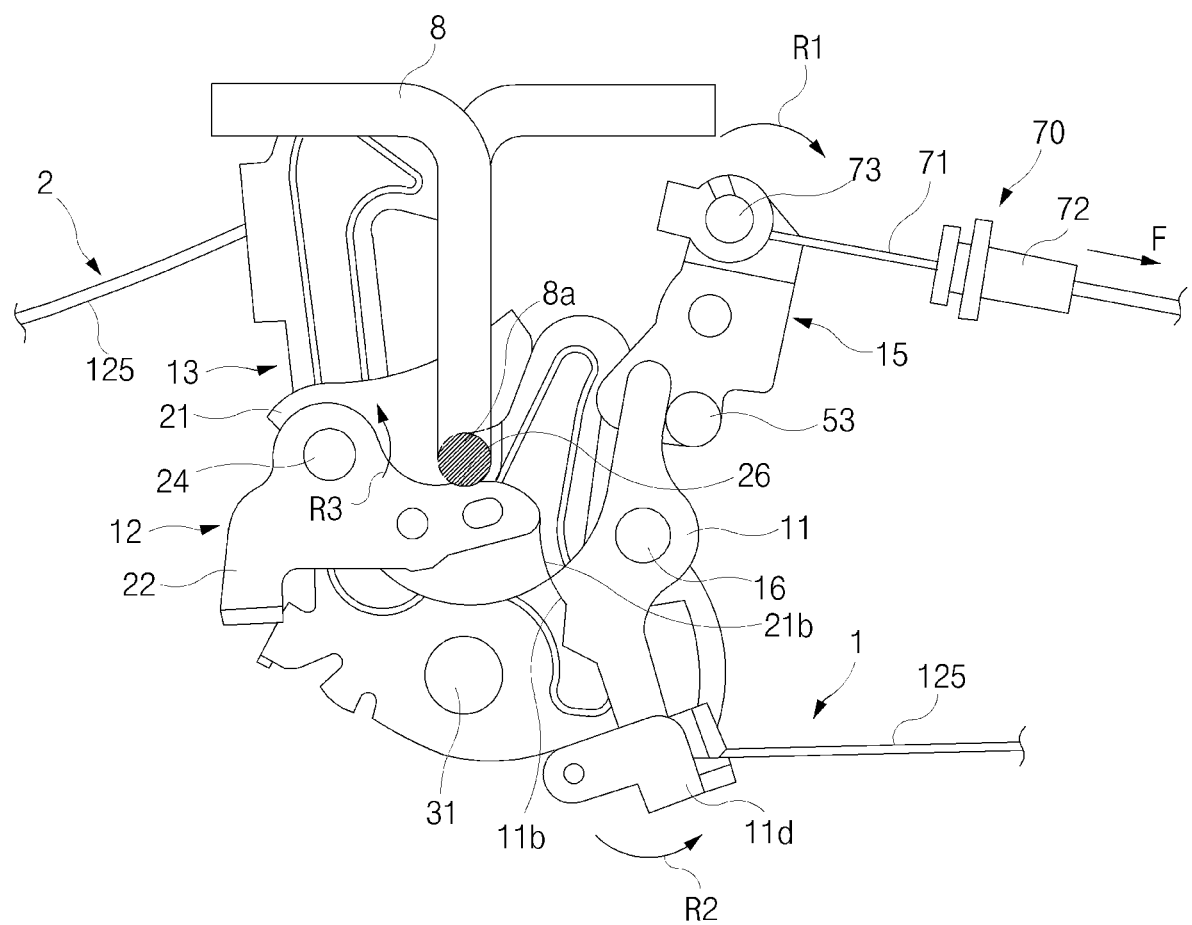
FIG. 15 illustrates a process in which an emergency lever moves from a first position to a second position, a pawl lever moves from an engaging position to a disengaging position, and a latch lever assembly moves from a first hold position to a first release position in a front lid latch apparatus for a vehicle according to an exemplary embodiment of the present disclosure.

According to an exemplary embodiment, the rotation direction of the latch lever assembly 12 may be the same as the rotation direction of the pawl lever 11. Referring to FIGS. 15 and 17, when the pawl lever 11 rotates in direction R2, the engaging surface 11b of the pawl lever 11 may be disengaged from the engaging surface 21b of the latch lever assembly 12, and the latch lever assembly 12 may rotate in direction R3 by a biasing force of the second biasing member 25.

Referring to FIGS. 3, 7, and 13, when the pawl lever 11 is in the engaging position, the engaging surface 11b of the pawl lever 11 may be engaged with the engaging surface 21b of the first latch lever 21 of the latch lever assembly 12, and accordingly the latch lever assembly 12 may be kept in the first hold position.

Referring to FIG. 17, when the pawl lever 11 is in the disengaging position, the engaging surface 11b of the pawl lever 11 may be completely disengaged from the engaging surface 21b of the first latch lever 21 of the latch lever assembly 12, and accordingly the latch lever assembly 12 may be in the first releasable position.

Figure 16:
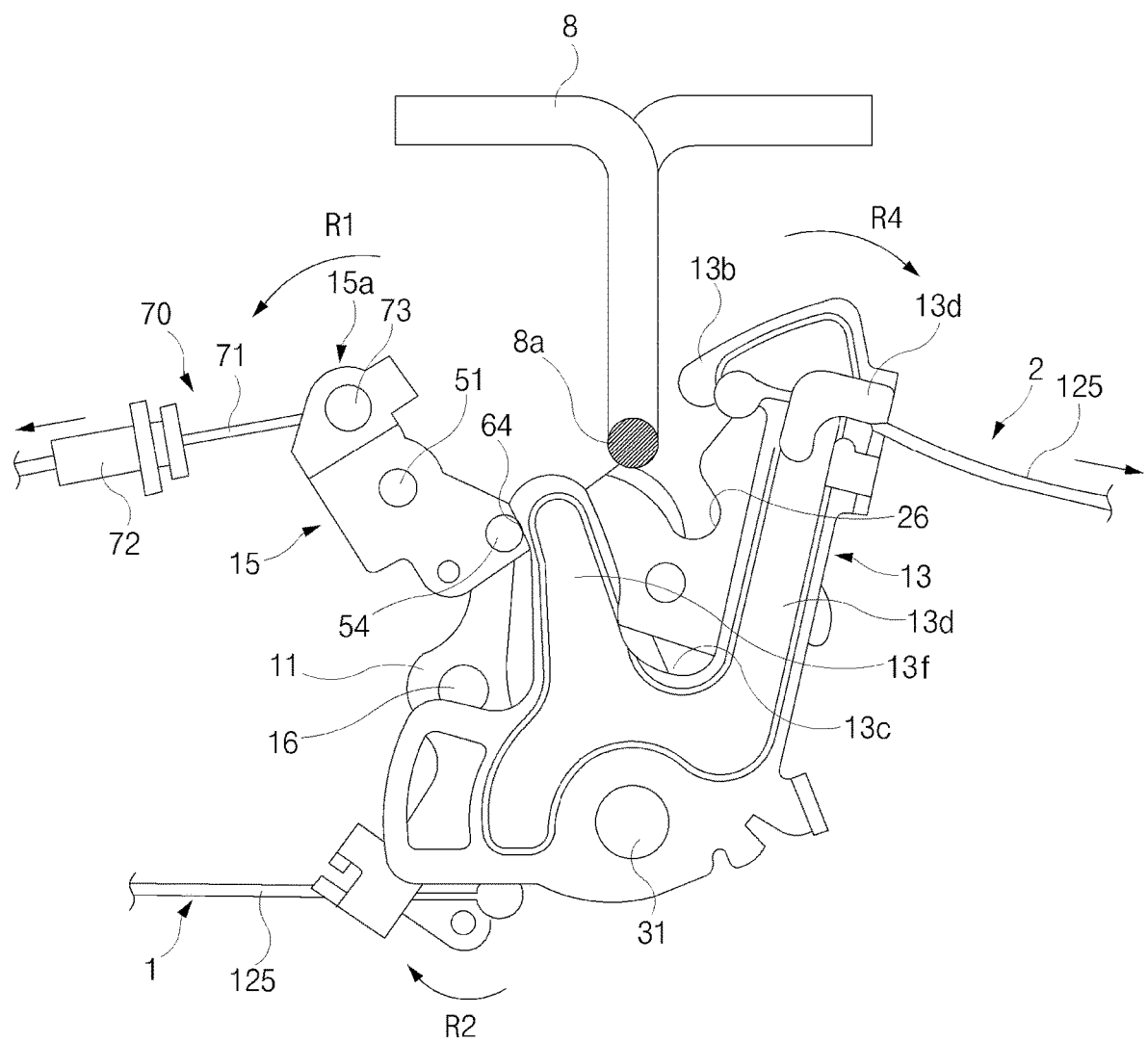
FIG. 16 illustrates a state in which an emergency lever is in a second position, a pawl lever is in a disengaging position, and a safety lever is in a second release position in a front lid latch apparatus for a vehicle according to an exemplary embodiment of the present disclosure.

Referring to FIGS. 2 and 3, the safety lever 13 may be rotatably mounted on the first surface of the first mounting bracket 5. The safety lever 13 may move between a second hold position and a second releasable position by a second actuator 2. Referring to FIGS. 4 to 7 and 12 to 15, the second hold position refers to a position in which the engaging leg 8a of the striker 8 is held by the safety lever 13. Referring to FIGS. 16 and 17, the second releasable position refers to a position in which the engaging leg 8a of the striker 8 is releasable from the safety lever 13.

Figure 4:
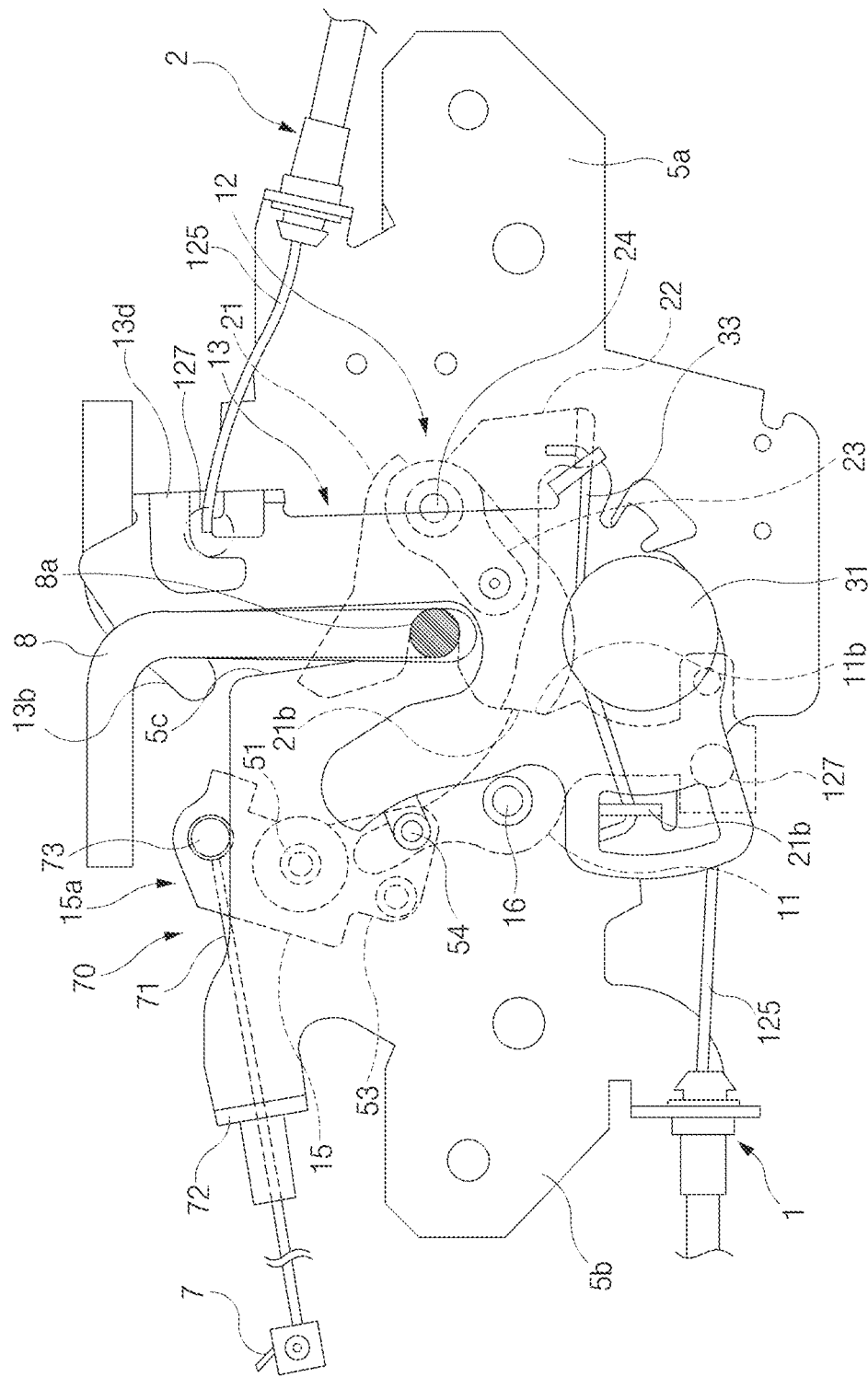
FIG. 4 illustrates a front view of a front lid latch apparatus for a vehicle according to an exemplary embodiment of the present disclosure.
Figure 5:
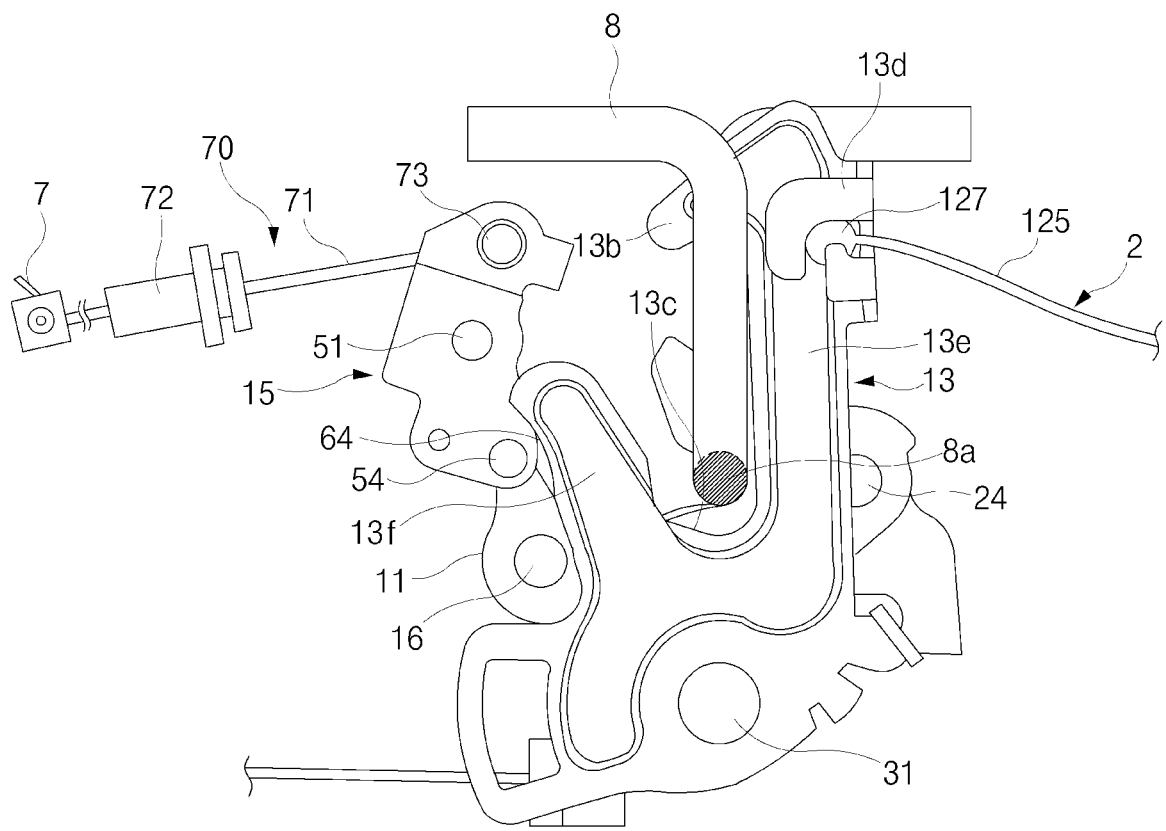
FIG. 5 illustrates a front view of a pawl lever, a latch lever assembly, and a safety lever of the front lid latch apparatus illustrated in FIG. 4, from which a first mounting bracket and a second mounting bracket are removed.

The second actuator 2 may include a drive motor using electric energy, and the second actuator 2 may be connected to the safety lever 13 through a release cable 125. Referring to FIG. 4, the safety lever 13 may have a fitting portion 13d into which a knob 127 of the release cable 125 of the second actuator 2 is fitted.

The safety lever 13 may be rotatably mounted on the first surface of the first mounting bracket 5 through a third pivot pin 31. The safety lever 13 may have a mounting hole 13a in which the third pivot pin 31 is mounted. The third pivot pin 31 may be mounted in the mounting hole 153 of the first mounting bracket 5, and the third pivot pin 31 may be fitted into the mounting hole 13a of the safety lever 13. As the safety lever 13 rotates (pivots) around the third pivot pin 31, the safety lever 13 may move between the second hold position (see FIGS. 4 to 7 and 12 to 15) and the second releasable position (see FIGS. 16 and 17).

A washer 32 may be disposed on the circumference of the third pivot pin 31, and the washer 32 may be interposed between the safety lever 13 and the first surface of the first mounting bracket 5 to prevent the safety lever 13 from being pressed against or frozen on the first surface of the first mounting bracket 5.

The safety lever 13 may be biased toward the second hold position by a third biasing member 33, and the third biasing member 33 may be mounted between the first mounting bracket 5 and the safety lever 13. For example, the third biasing member 33 may be a torsion spring, and the third biasing member 33 may be disposed on the circumference of the third pivot pin 31.

The safety lever 13 may have a hook 13b by which the engaging leg 8a of the striker 8 is held. When the safety lever 13 is in the second hold position, the hook 13b of the safety lever 13 may be located above the engaging leg 8a of the striker 8. Accordingly, the hook 13b of the safety lever 13 may block a vertical movement path of the engaging leg 8a of the striker 8, and the movement of the engaging leg 8a of the striker 8 may be restricted by the hook 13b of the safety lever 13 so that abnormal opening of the front lid may be prevented.

Referring to FIG. 4, the hook 13b may be located above a top end of the slot 5c of the first mounting bracket 5, and thus the engaging leg 8a of the striker 8 may be prevented from being released or separated from the slot 5c of the first mounting bracket 5.

When the safety lever 13 is in the second releasable position, the hook 13b may be biased toward one side from the top end of the slot 5c of the first mounting bracket 5, and thus the engaging leg 8a of the striker 8 may be released or separated from the slot 5c of the first mounting bracket 5.

The safety lever 13 may have a slot 13c. When the safety lever 13 moves between the second hold position and the second releasable position, the slot 13c of the safety lever 13 may be aligned or misaligned with the slot 5c of the first mounting bracket 5.

The safety lever 13 may include a first extension portion 13e facing the latch lever assembly 12, and a second extension portion 13f facing the pawl lever 11. The first extension portion 13e and the second extension portion 13f may define the slot 13c. The first extension portion 13e may extend relatively longer than the slot 5c of the first mounting bracket 5, and the second extension portion 13f may be shorter than the first extension portion 13e.

The hook 13b may be provided on a top end of the first extension portion 13e, and the hook 13b may protrude from the top end of the first extension portion 13e toward the second extension portion 13f and the emergency lever 15.

Figure 10:
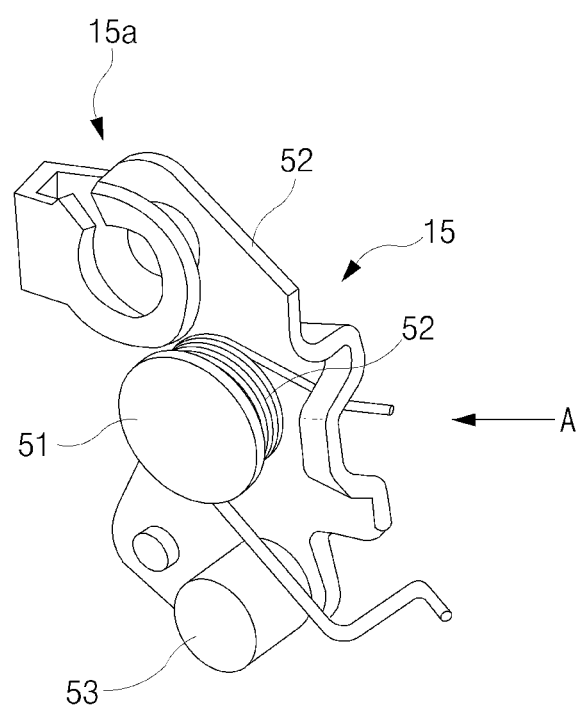
FIG. 10 illustrates a perspective view of an emergency lever of a front lid latch apparatus for a vehicle according to an exemplary embodiment of the present disclosure.
Figure 11:
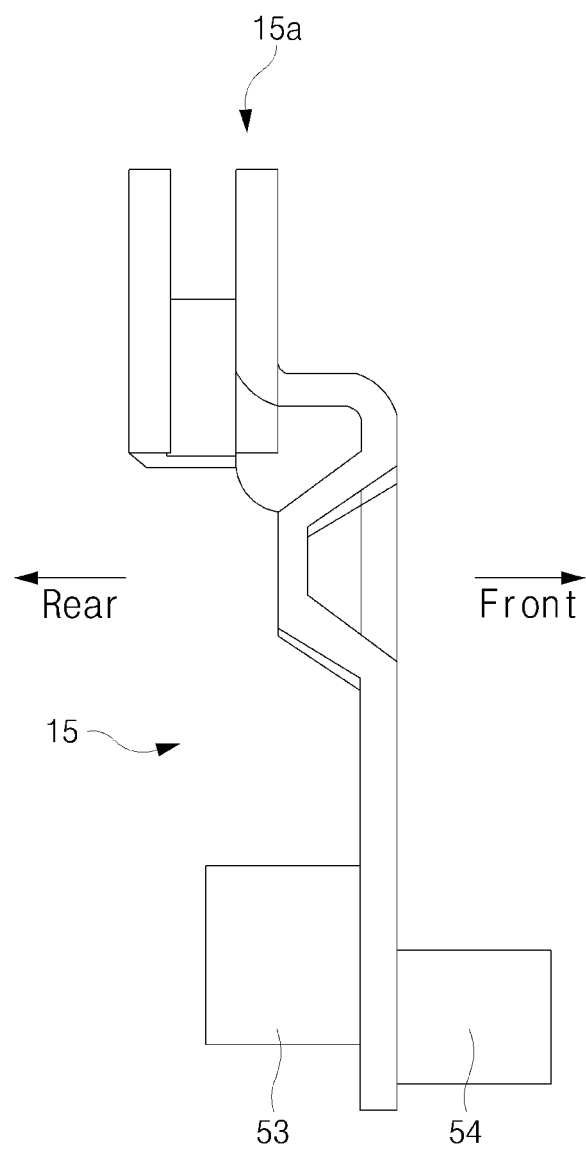
FIG. 11 illustrates a view which is viewed in direction A of FIG. 10.

Referring to FIG. 2, the emergency lever 15 may be disposed between the first mounting bracket 5 and the second mounting bracket 6. Referring to FIGS. 2 and 3, the emergency lever 15 may be rotatably mounted on the second surface of the first mounting bracket 5. The emergency lever 15 may move between a first position and a second position by a manually operable emergency release cable 71. Referring to FIGS. 4 to 7, an emergency handle 7 manually operated by a user may be connected to the emergency lever 15 through the emergency release cable 71, and the emergency handle 7 may be disposed adjacent to a driver's seat or a front passenger seat of the vehicle. Referring to FIGS. 10 and 11, the emergency lever 15 may have a mounting portion 15a on which a knob 73 of the emergency release cable 71 is mounted. The movement of the emergency release cable 71 may be guided by a cable guide 72, and the cable guide 72 may be fixedly mounted on one side of the first mounting bracket 5.

The first position refers to a position in which the emergency lever 15 keeps the pawl lever 11 in the engaging position, keeps the latch lever assembly 12 in the first hold position, and keeps the safety lever 13 in the second hold position, and the second position refers to a position in which the emergency lever 15 forces the pawl lever 11 to move to the disengaging position, forces the latch lever assembly 12 to move to the first releasable position, and forces the safety lever 13 to move to the second releasable position. As the user does not operate the emergency handle 7 in a normal condition, the emergency lever 15 may be in the first position (see FIGS. 4 to 7, 12, and 13). When the user pulls the emergency handle 7 in an emergency condition, the emergency lever 15 may move to the second position (see FIGS. 16 and 17) by the emergency release cable 71. Specifically, the emergency lever 15 may force the pawl lever 11 to move to the disengaging position, force the latch lever assembly 12 to move to the first releasable position, and force the safety lever 13 to move to the second releasable position in an emergency condition in which the first actuator 1 and the second actuator 2 are inoperable due to the failure of the power supply.

Referring to FIG. 3, the emergency lever 15 may be rotatably mounted on the second surface of the first mounting bracket 5 through a fourth pivot pin 51. The emergency lever 15 may have a mounting hole in which the fourth pivot pin 51 is mounted. The fourth pivot pin 51 may be mounted in the mounting hole 154 of the first mounting bracket 5, and the fourth pivot pin 51 may be fitted into the mounting hole of the emergency lever 15. As the emergency lever 15 rotates (pivots) around the fourth pivot pin 51, the emergency lever 15 may move between the first position (see FIGS. 4 to 7, 12, and 13) and the second position (see FIGS. 16 and 17).

The emergency lever 15 may be biased toward the first position by a fourth biasing member 52, and the fourth biasing member 52 may be mounted between the first mounting bracket 5 and the emergency lever 15. For example, the fourth biasing member 52 may be a torsion spring, and the fourth biasing member 52 may be disposed on the circumference of the fourth pivot pin 51. As the user pulls the emergency handle 7, the emergency release cable 71 may pull the emergency lever 15 to move the emergency lever 15 to the second position. Thereafter, when the user returns the emergency handle 7 to the original position, the emergency lever 15 may return to the first position by the fourth biasing member 52.

Referring to FIG. 11, the emergency lever 15 may include a first guide pin 53 and a second guide pin 54 protruding in opposite directions.

Figure 6:
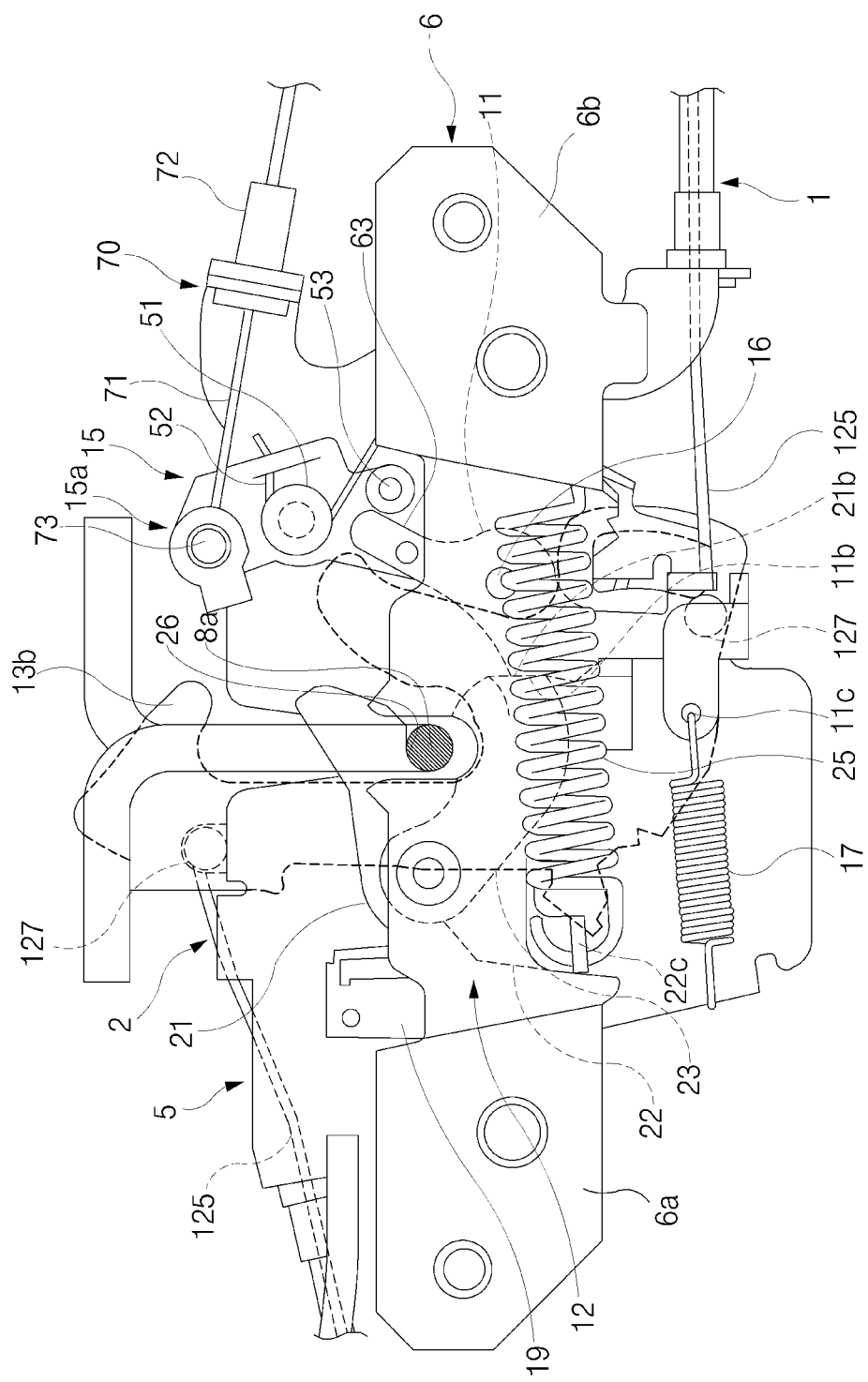
FIG. 6 illustrates a rear view of a front lid latch apparatus for a vehicle according to an exemplary embodiment of the present disclosure.

The first guide pin 53 may protrude toward the rear of the vehicle. Referring to FIGS. 3 and 10, the first guide pin 53 may protrude from the emergency lever 15 toward the second mounting bracket 6 and the pawl lever 11. Referring to FIGS. 6 and 7, the first guide pin 53 may contact a top end portion of the pawl lever 11, and the top end portion of the pawl lever 11 may have a first guide surface 63 guiding the movement of the first guide pin 53. The first guide surface 63 may be inclined at a predetermined angle or curved with a predetermined radius of curvature. When the emergency lever 15 rotates, the first guide pin 53 may move along the first guide surface 63, and accordingly the pawl lever 11 may rotate (pivot) around the first pivot pin 16. According to an exemplary embodiment, the rotation direction of the pawl lever 11 may be opposite to the rotation direction of the emergency lever 15. Referring to FIGS. 15 and 17, when the emergency lever 15 rotates in direction R1, the first guide pin 53 of the emergency lever 15 may be guided along the first guide surface 63 of the pawl lever 11, and accordingly the pawl lever 11 may rotate in direction R2.

Figure 8:
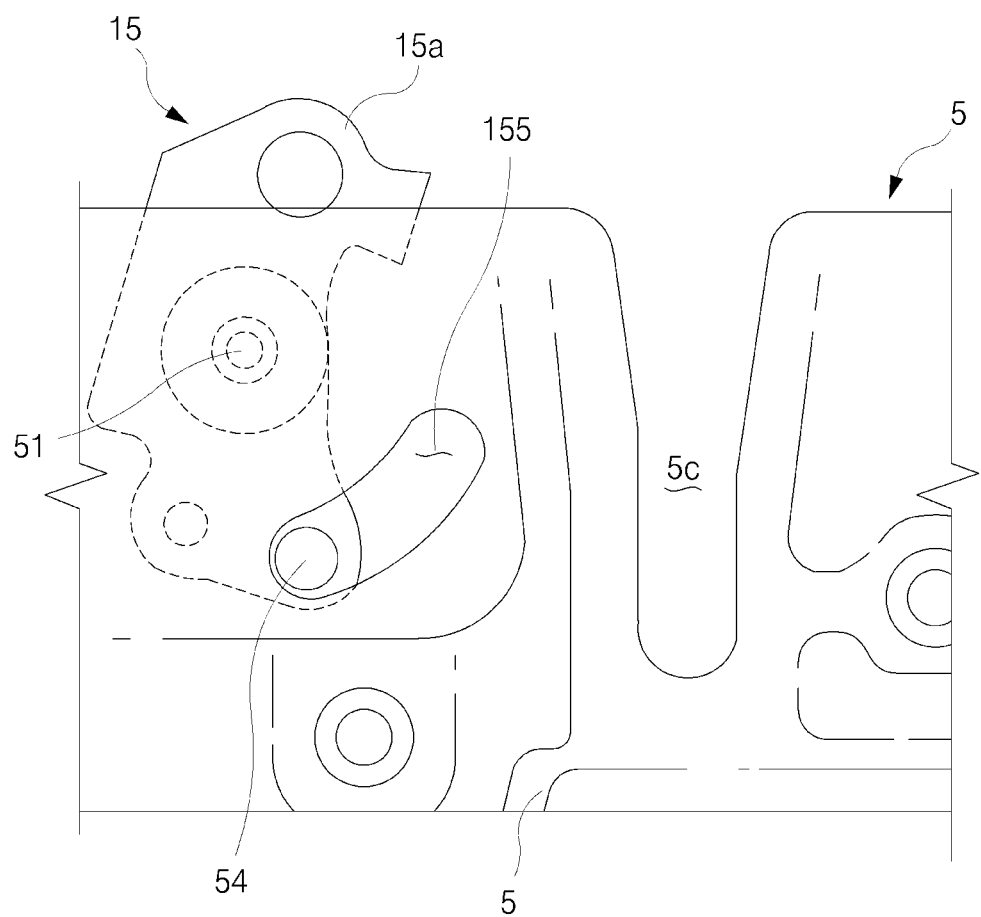
FIG. 8 illustrates a portion of a first mounting bracket of a front lid latch apparatus for a vehicle according to an exemplary embodiment of the present disclosure.
Figure 9:
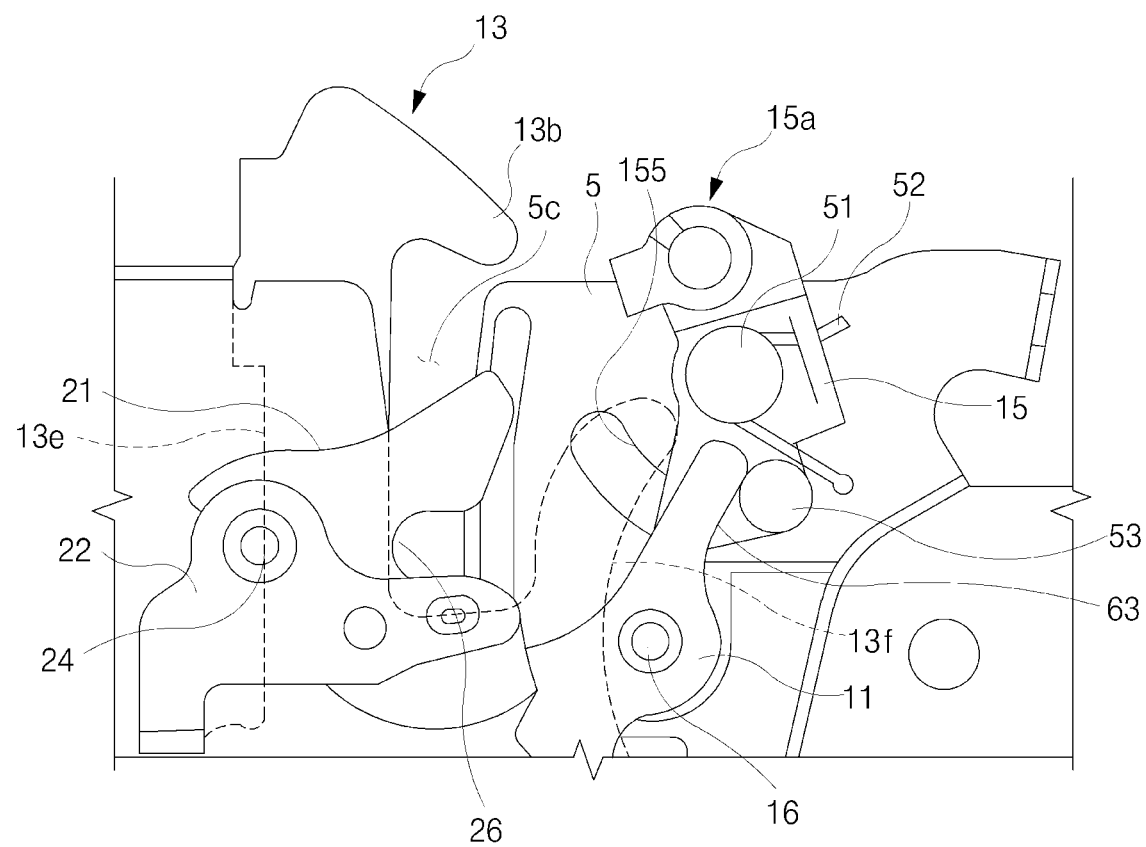
FIG. 9 illustrates a portion of the front lid latch apparatus illustrated in FIG. 6.

The second guide pin 54 may protrude toward the front of the vehicle. The second guide pin 54 may protrude from the emergency lever 15 toward the safety lever 13. Referring to FIGS. 3 and 8, the first mounting bracket 5 may have a guide slot 155 guiding the movement of the second guide pin 54, and the guide slot 155 may have an arc shape with a predetermined radius. The second guide pin 54 may extend through the guide slot 155 of the first mounting bracket 5, and the second guide pin 54 may contact the safety lever 13. Referring to FIGS. 5, 12, 14, and 16, the safety lever 13 may have a second guide surface 64 provided on a portion thereof adjacent to the second guide pin 54. When the emergency lever 15 moves to the second position, the second guide pin 54 may move along the second guide surface 64 of the safety lever 13. The second guide surface 64 may be provided on the second extension portion 13f of the safety lever 13, and the second guide surface 64 may be inclined at a predetermined angle or curved with a predetermined radius of curvature. When the emergency lever 15 rotates, the second guide pin 54 may move along the second guide surface 64, and the safety lever 13 may rotate (pivot) around the third pivot pin 31. According to an exemplary embodiment, the rotation direction of the safety lever 13 may be opposite to the rotation direction of the emergency lever 15. Referring to FIG. 16, when the emergency lever 15 rotates in direction R1, the second guide pin 54 of the emergency lever 15 may be guided along the second guide surface 64 of the safety lever 13, and accordingly the safety lever 13 may rotate in direction R4.

Referring to FIG. 2, the front lid latch apparatus for a vehicle according to an exemplary embodiment of the present disclosure may further include a sensor 19 for detecting a position of the latch lever assembly 12. The sensor 19 may be a contact sensor having a contact member 19a which comes into contact with the latch lever assembly 12. The sensor 19 may be configured to detect whether the latch lever assembly 12 is in the first hold position or the first releasable position. The sensor 19 may have access to a controller (not shown), and the controller may notify a driver (or an occupant) of a state in which the emergency opening of the front lid is possible based on the detection results of the sensor 19. Referring to FIG. 13, the sensor 19 may detect that the latch lever assembly 12 is in the first hold position, and the controller may notify the driver (or the occupant) of a state in which the striker 8 is held by the latch lever assembly 12. Referring to FIG. 17, the sensor 19 may detect that the latch lever assembly 12 is in the first releasable position, and the controller may notify the driver (or the occupant) of a state in which the striker 8 is releasable from the latch lever assembly 12.

The first actuator 1 may be connected to the pawl lever 11, and the first actuator 1 may rotate the pawl lever 11 through the drive motor and the release cable. The second actuator 2 may be connected to the safety lever 13, and the second actuator 2 may rotate the safety lever 13 through the drive motor and the release cable.

According to an exemplary embodiment, as the first actuator 1 rotates the pawl lever 11, and the second actuator 2 rotates the safety lever 13, the first actuator 1 and the second actuator 2 may have the same structure.

Figure 18:
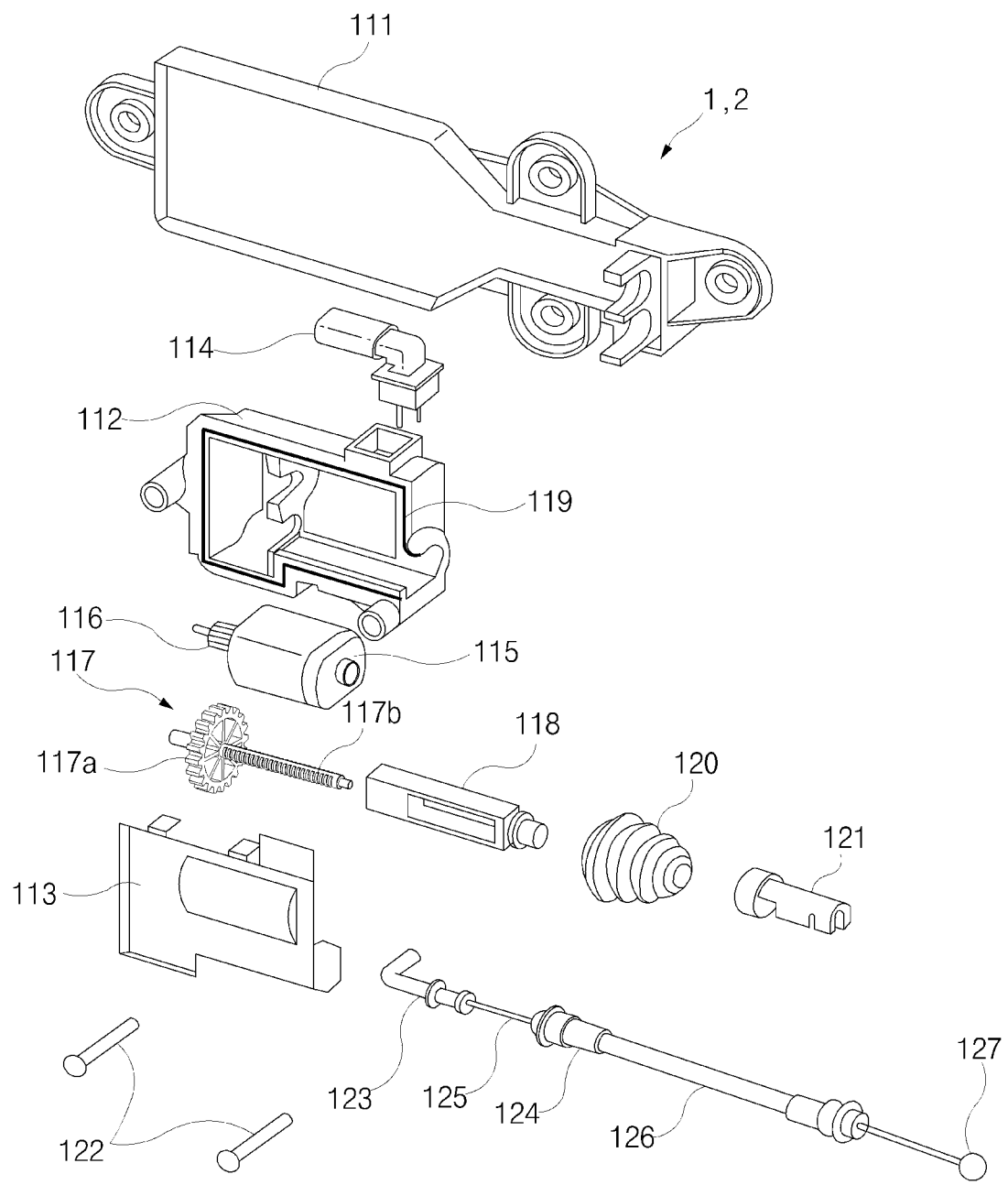
FIG. 18 illustrates an exploded perspective view of a first actuator and a second actuator in a front lid latch apparatus for a vehicle according to an exemplary embodiment of the present disclosure.
Figure 19:
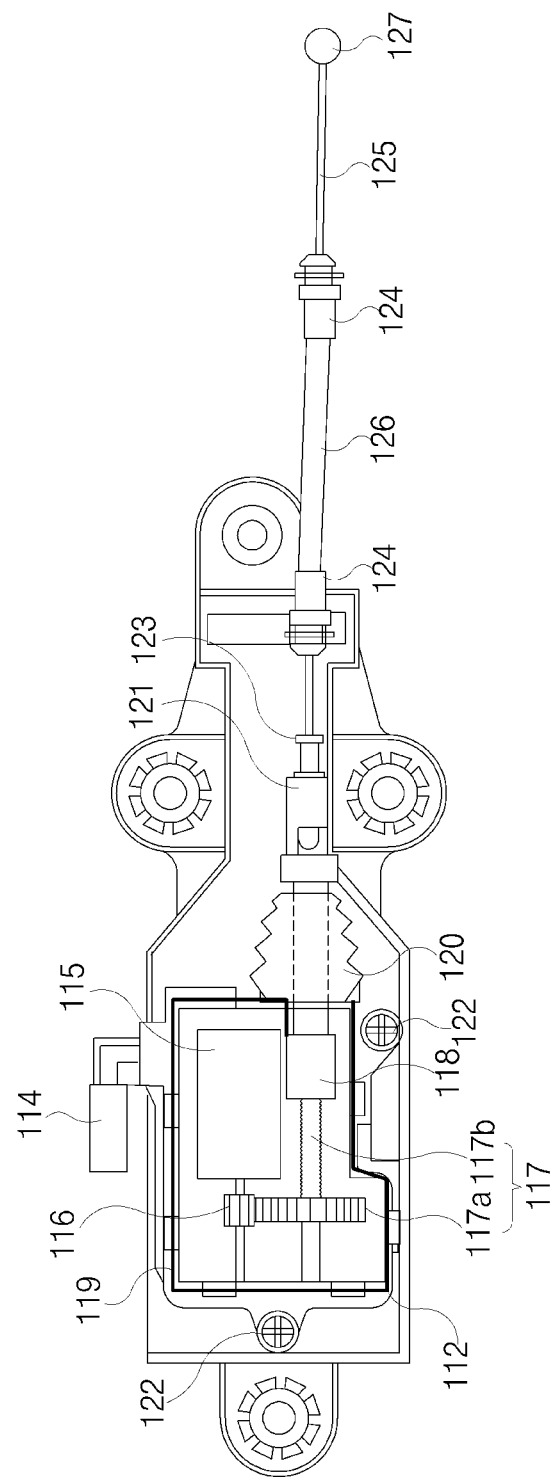
FIG. 19 illustrates a plan view of a first actuator and a second actuator in a front lid latch apparatus for a vehicle according to an exemplary embodiment of the present disclosure.

Referring to FIGS. 18 and 19, each of the first actuator 1 and the second actuator 2 may include a drive motor 115, a drive gear 116 connected to an output shaft of the drive motor 115, a rotating body 117 rotated by the drive gear 116, a moving body 118 moving linearly by the rotation of the rotating body 117, and the release cable 125 connected to the moving body 118.

A housing 112 may have an opening which is opened toward the outside, and the drive motor 115, the drive gear 116, the rotating body 117, and a portion of the moving body 118 may be received in the housing 112 through the opening of the housing 112. The housing 112 may be fixedly mounted on a bracket 11, and the opening of the housing 112 may be covered by a housing cover 113. The housing cover 113 may be mounted to the housing 112 through a screw 122. A sealing member 119 may be mounted on edges of the housing 112. A connector 114 may be electrically connected to the drive motor 115, and electric energy may be transferred from an external battery to the drive motor 115 through the connector 114.

The drive gear 116 may be a spur gear. As the drive motor 115 operates, the drive gear 116 may rotate. The rotating body 117 may include a driven gear 117a meshing with the drive gear 116 and a lead screw 117b extending from the driven gear 117a. The driven gear 117a and the lead screw 117b may form a unitary one-piece structure. As the driven gear 117a is rotated by the drive gear 116, the lead screw 117b may rotate together with the driven gear 117a in the same direction. The lead screw 117b may have external threads on its external surface.

The moving body 118 may be a nut block having internal threads meshing with the external threads of the lead screw 117b. As the lead screw 117b rotates, the moving body 118 may move linearly. The housing 112 may have a guide hole allowing the movement of the moving body 118, and the moving body 118 may move (forward or backward) along the guide hole of the housing 112.

A dust cover 120 may be mounted in the guide hole of the housing 112, and the dust cover 120 may block moisture, dust, and other foreign objects from entering the housing 112.

The release cable 125 may have a first end portion connected to the moving body 118, and a second end portion connected to the pawl lever 11 or the safety lever 13. An L-shaped rod 123 may be fixed to the first end portion of the release cable 125, and the knob 127 may be fixed to the second end portion of the release cable 125.

The rod 123 may be connected to the moving body 118 through a connection member 121, and the first end portion of the release cable 125 may be connected to the moving body 118 through the rod 123 and the connection member 121. As the moving body 118 moves linearly, the release cable 125 may move together with the moving body 118 in the same direction.

The movement of the release cable 125 may be guided by two cable guides 124 and a sleeve 126. The two cable guides 124 may be fixed to both ends of the sleeve 126.

Figure 12:
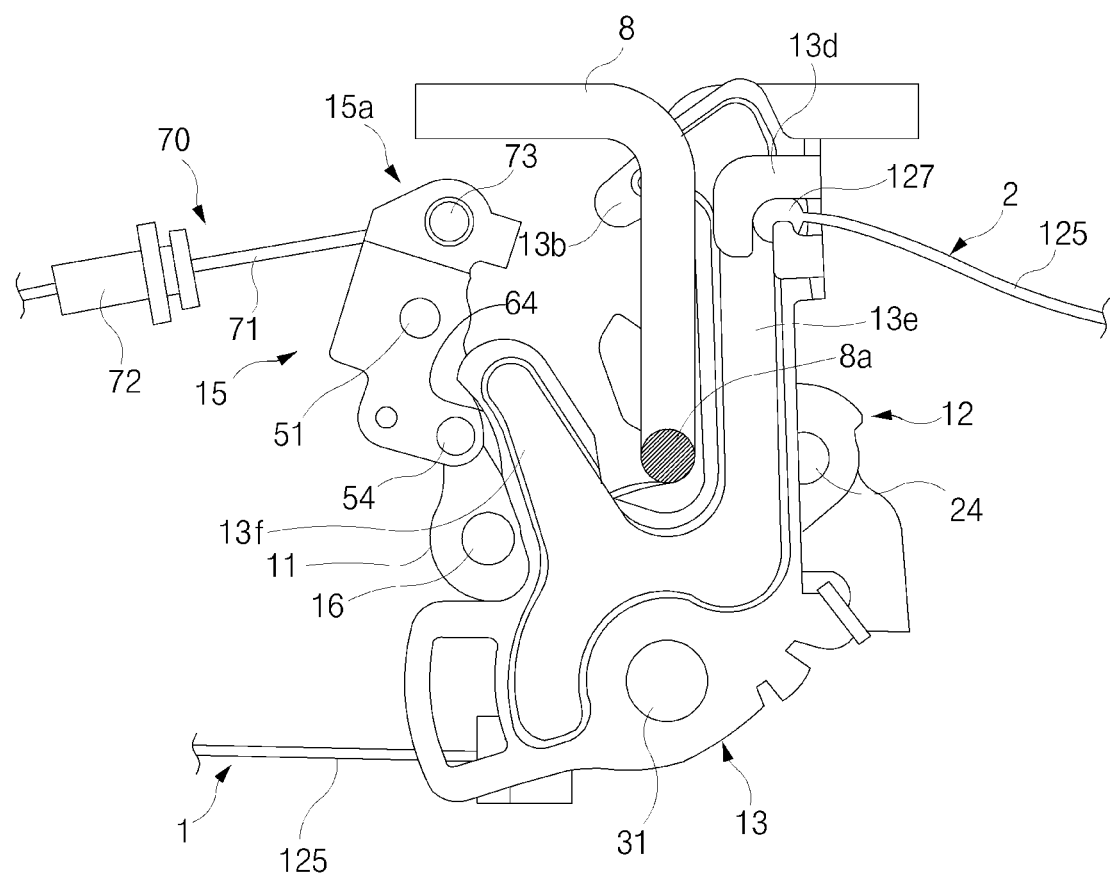
FIG. 12 illustrates a state in which an emergency lever is in a first position and a safety lever is in a second hold position in a front lid latch apparatus for a vehicle according to an exemplary embodiment of the present disclosure.

Referring to FIG. 7, the knob 127 of the first actuator 1 may be fitted into the fitting portion 11d of the pawl lever 11. Referring to FIG. 12, the knob 127 of the second actuator 2 may be fitted into the fitting portion 13d of the safety lever 13.

Referring to FIG. 13, when the pawl lever 11 is in the engaging position, the latch lever assembly 12 may be in the first hold position so that the catch slot 26 of the latch lever assembly 12 may hold the engaging leg 8a of the striker 8, and thus the front lid may be locked to the front lid latch apparatus. In a state in which the pawl lever 11 is in the engaging position, and the latch lever assembly 12 is in the first hold position, as illustrated in FIG. 12, when the safety lever 13 is in the second hold position, the hook 13b of the safety lever 13 may be located above the engaging leg 8a of the striker 8, thereby preventing the front lid from abnormally being opened.

Figure 14:
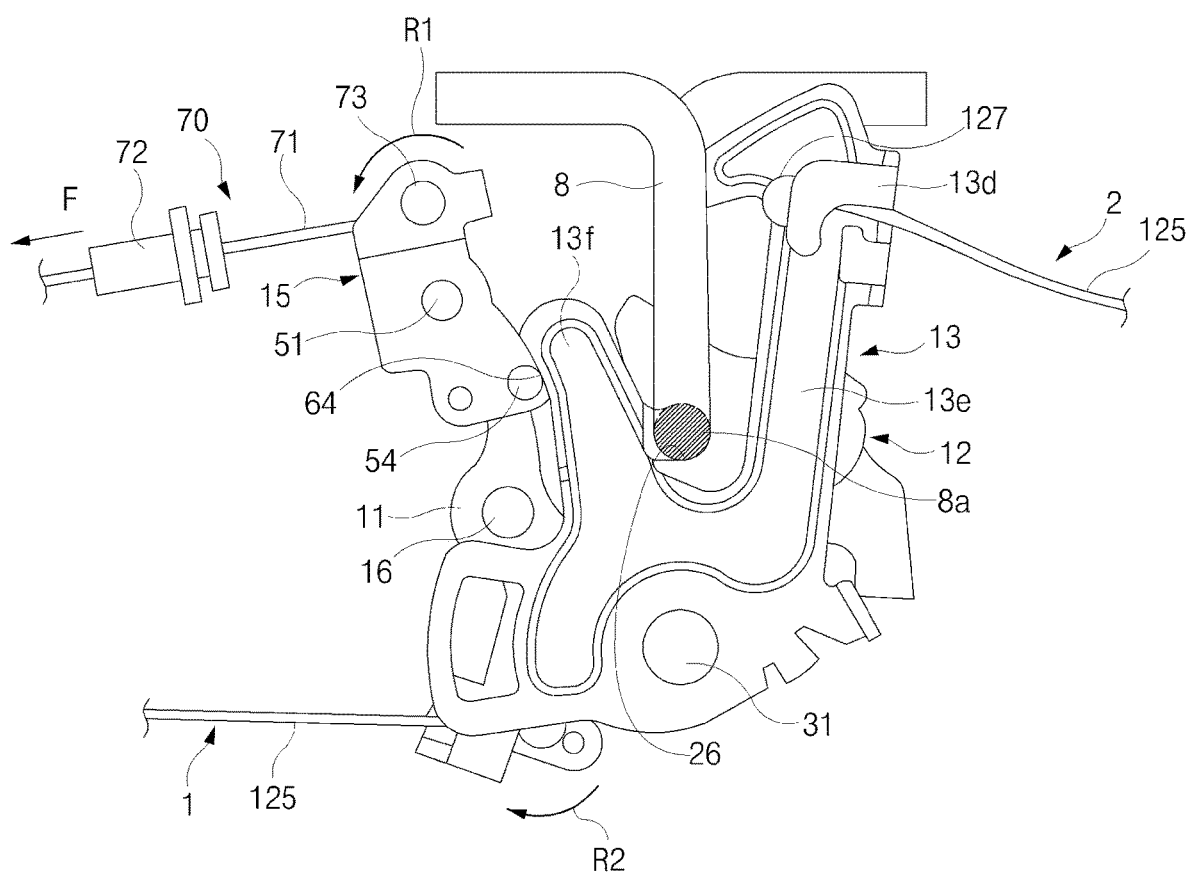
FIG. 14 illustrates a process in which an emergency lever moves from a first position to a second position, and a pawl lever moves from an engaging position to a disengaging position in a front lid latch apparatus for a vehicle according to an exemplary embodiment of the present disclosure.

In an emergency condition in which electric energy cannot be supplied to at least one of the first actuator 1 and the second actuator 2, as illustrated in FIGS. 14 and 15, when the user pulls the emergency handle 7, the emergency release cable 71 may move in direction F, and accordingly the emergency lever 15 may start to rotate in direction R1, and the emergency lever 15 may move toward the second position. As illustrated in FIG. 15, when the emergency lever 15 starts to rotate in direction R1, the first guide pin 53 of the emergency lever 15 may be guided along the first guide surface 63 of the pawl lever 11, and accordingly the pawl lever 11 may start to rotate in direction R2. When the pawl lever 11 starts to rotate in direction R2, the pawl lever 11 may move toward the disengaging position. As the pawl lever 11 moves toward the disengaging position, the latch lever assembly 12 may move toward the first releasable position.

Referring to FIG. 16, when the emergency lever 15 continues to rotate in R1, the second guide pin 54 of the emergency lever 15 may be guided along the second guide surface 64 of the pawl lever 11, and accordingly the safety lever 13 may rotate in direction R4, and the safety lever 13 may be in the second releasable position. Referring to FIG. 17, as the pawl lever 11 is in the disengaging position, the engaging surface 11b of the pawl lever 11 may be completely disengaged from the engaging surface 21b of the first latch lever 21 of the latch lever assembly 12. As the latch lever assembly 12 rotates in direction R3, the latch lever assembly 12 may completely move toward the first releasable position.

As the safety lever 13 is in the second releasable position, and the latch lever assembly 12 is in the first releasable position, the striker 8 of the front lid may be released from the front lid latch apparatus, which may facilitate the emergency opening of the front lid.

As set forth above, according to exemplary embodiments of the present disclosure, the emergency lever may be connected to the emergency handle through the emergency release cable to make the emergency release of the striker easy, and thus the emergency opening of the front lid may be facilitated.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A front lid latch apparatus for a vehicle, the apparatus comprising:
    a pawl lever movable between an engaging position and a disengaging position by a first actuator, wherein the first actuator includes a first driving motor that is operatively connected to the pawl lever;
    a latch lever assembly movable between a first hold position and a first releasable position by a movement of the pawl lever;
    a safety lever movable between a second hold position and a second releasable position by a second actuator, wherein the second actuator includes a second driving motor that is operatively connected to the safety lever, and wherein the second actuator is opposite to the first actuator; and
    an emergency lever operatively connected to the pawl lever and the safety lever, and movable between a first position and a second position by a manually operable emergency release cable,
    wherein:
        the emergency lever includes a first guide pin and a second guide pin protruding in opposite directions,
        the first guide pin protrudes toward and contacts the pawl lever,
        the pawl lever comprises a first guide surface configured to guide a movement of the first guide pin when the first guide pin contacts the pawl lever,
        the first guide surface is curved with a first predetermined radius of curvature,
        the second guide pin protrudes toward and contacts the safety lever,
        the safety lever has a second guide surface configured to guide a movement of the second guide pin when the second guide pin contacts the safety lever, and
        the second guide surface is curved with a second predetermined radius of curvature.

2. The apparatus according to claim 1, wherein:
    the pawl lever is biased toward the engaging position by a first biasing member;
    the latch lever assembly is biased toward the first releasable position by a second biasing member;
    the safety lever is biased toward the second hold position by a third biasing member; and
    the emergency lever is biased toward the first position by a fourth biasing member.

3. The apparatus according to claim 1, further comprising a mounting bracket rotatably supporting the pawl lever, the latch lever assembly, the safety lever, and the emergency lever.

4. The apparatus according to claim 1, wherein the mounting bracket comprises:
    a first surface on which the safety lever is rotatably mounted; and
    a second surface on which the pawl lever, the latch lever assembly, and the emergency lever are rotatably mounted.

5. The apparatus according to claim 4, wherein:
    the pawl lever is rotatably mounted on the second surface of the mounting bracket through a first pivot pin;
    the latch lever assembly is rotatably mounted on the second surface of the mounting bracket through a second pivot pin;
    the safety lever is rotatably mounted on the first surface of the mounting bracket through a third pivot pin; and
    the emergency lever is rotatably mounted on the second surface of the mounting bracket through a fourth pivot pin.

6. The apparatus according to claim 3, wherein the mounting bracket comprises a guide slot configured to guide the movement of the second guide pin.

7. The apparatus according to claim 1, wherein the apparatus is configured so that:
    when the emergency lever is in the first position, the pawl lever is in the engaging position, the latch lever assembly is in the first hold position, and the safety lever is in the second hold position; and
    when the emergency lever is in the second position, the pawl lever is in the disengaging position, the latch lever assembly is in the first releasable position, and the safety lever is in the second releasable position.

8. A vehicle comprising:
    a vehicle body comprising a front structure;
    a front lid coupled to the front structure;
    a striker mounted on the front lid;
    a first actuator and a second actuator;
    a manually operable emergency release cable;
    a pawl lever movable between an engaging position and a disengaging position by the first actuator, wherein the first actuator includes a first driving motor that is operatively connected to the pawl lever;

a latch lever assembly movable between a first hold position and a first releasable position by a movement of the pawl lever;

a safety lever movable between a second hold position and a second releasable position by the second actuator, wherein:
 the second actuator includes a second driving motor that is operatively connected to the safety lever, and
 the second actuator is opposite to the first actuator; and an emergency lever operatively connected to the pawl lever and the safety lever, and movable between a first position and a second position by the manually operable emergency release cable, wherein:
 the emergency lever includes a first guide pin and a second guide pin protruding in opposite directions,
 the first guide pin protrudes toward and contacts the pawl lever,
 the pawl lever comprises a first guide surface configured to guide a movement of the first guide pin when the first guide pin contacts the pawl lever,
 the first guide surface is curved with a first predetermined radius of curvature,
 the second guide pin protrudes toward and contacts the safety lever,
 the safety lever has a second guide surface configured to guide a movement of the second guide pin when the second guide pin contacts the safety lever, and
 the second guide surface is curved with a second predetermined radius of curvature.

9. The vehicle according to claim 8, wherein:
the pawl lever is biased toward the engaging position by a first biasing member;
the latch lever assembly is biased toward the first releasable position by a second biasing member;
the safety lever is biased toward the second hold position by a third biasing member; and
the emergency lever is biased toward the first position by a fourth biasing member.

10. The vehicle according to claim 8, further comprising a mounting bracket comprising:
 a first surface on which the safety lever is rotatably mounted; and
 a second surface on which the pawl lever, the latch lever assembly, and the emergency lever are rotatably mounted.

11. The vehicle according to claim 10, wherein:
the pawl lever is rotatably mounted on the second surface of the mounting bracket through a first pivot pin;
the latch lever assembly is rotatably mounted on the second surface of the mounting bracket through a second pivot pin;
the safety lever is rotatably mounted on the first surface of the mounting bracket through a third pivot pin; and
the emergency lever is rotatably mounted on the second surface of the mounting bracket through a fourth pivot pin.

12. The vehicle according to claim 8, wherein the vehicle is configured so that:
 when the emergency lever is in the first position, the pawl lever is in the engaging position, the latch lever assembly is in the first hold position, and the safety lever is in the second hold position; and
 when the emergency lever is in the second position, the pawl lever is in the disengaging position, the latch lever assembly is in the first releasable position, and the safety lever is in the second releasable position.

* * * * *